United States Patent [19]

Mills

[11] 4,123,112
[45] Oct. 31, 1978

[54] SPLIT WHEEL SAFETY FEATURE
[75] Inventor: Peter M. Mills, Pickering, Canada
[73] Assignee: Titan Proform Company Limited, Scarborough, Canada
[21] Appl. No.: 816,910
[22] Filed: Jul. 18, 1977
[51] Int. Cl.² ............................................. B60B 25/16
[52] U.S. Cl. ............................ 301/35 BJ; 301/63 DS; 152/404; 152/413
[58] Field of Search ............... 301/35 BJ, 35 R, 63 D, 301/63 DS; 152/404, 413

[56] References Cited
U.S. PATENT DOCUMENTS

| 1,609,878 | 12/1926 | Liddell | 152/413 X |
| 2,237,481 | 4/1941 | Ferro | 301/35 R |
| 2,252,194 | 8/1941 | Mills | 301/63 D |
| 2,308,959 | 1/1943 | Brink | 301/63 DS |

FOREIGN PATENT DOCUMENTS 27,577 of 1907 United Kingdom ...................... 152/413

Primary Examiner—Robert B. Reeves
Assistant Examiner—Charles A. Marmor
Attorney, Agent, or Firm—Hirons & Rogers

[57] ABSTRACT

A split wheel assembly for reception of pneumatic tires is provided with a safety feature to ensure that the two halves of the wheel cannot be dismantled when the tire thereon is pressurized. The assembly flanges of the two wheel portions have series of assembling apertures which register in pairs. The aperture on one of the flanges is circumferentially extending, and has a narrow end and a broad end. The narrow end of the aperture extends to an axially extending depression on the surface presented towards the flange of the other rim section. A bolt passes through the apertures, for assembling purposes, the bolt having a washer which fits into the depression, and having a securing nut which is sized so as to pass through the broad end of the aperture but not through the narrow end. In order to dismantle the wheel, the nut must be loosened sufficiently to cause separation of the two rim flanges so that the washer can move out of the depression, and the bolt can be moved axially to the broad end of the aperture. Such separation of the rim sections automatically causes deflation of the tire, if it is pressurized.

7 Claims, 4 Drawing Figures

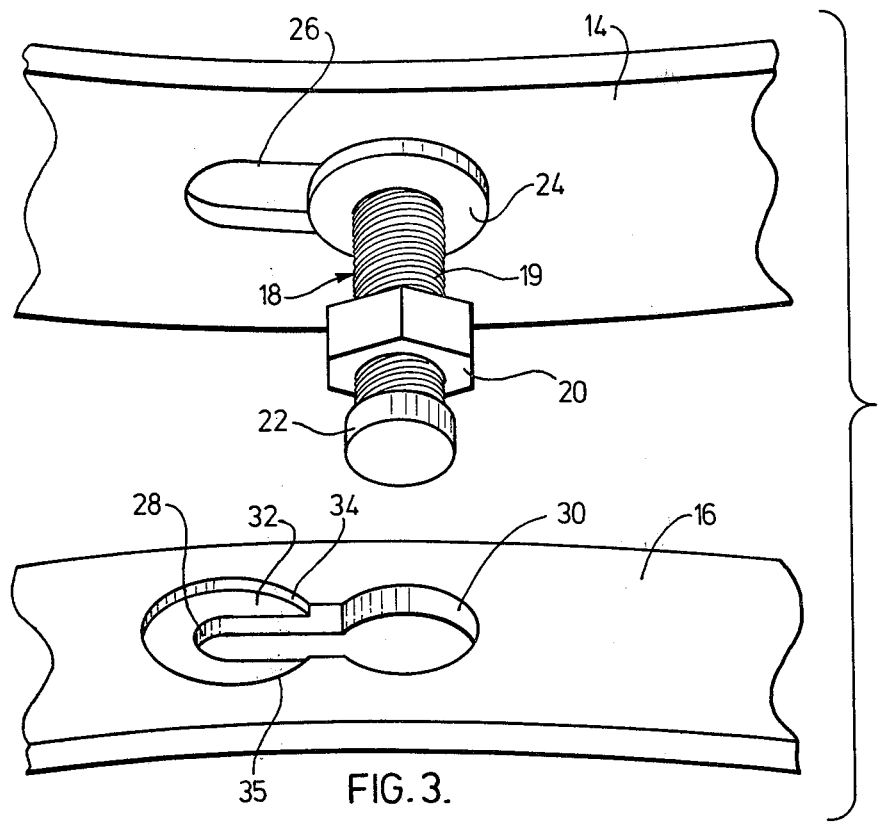
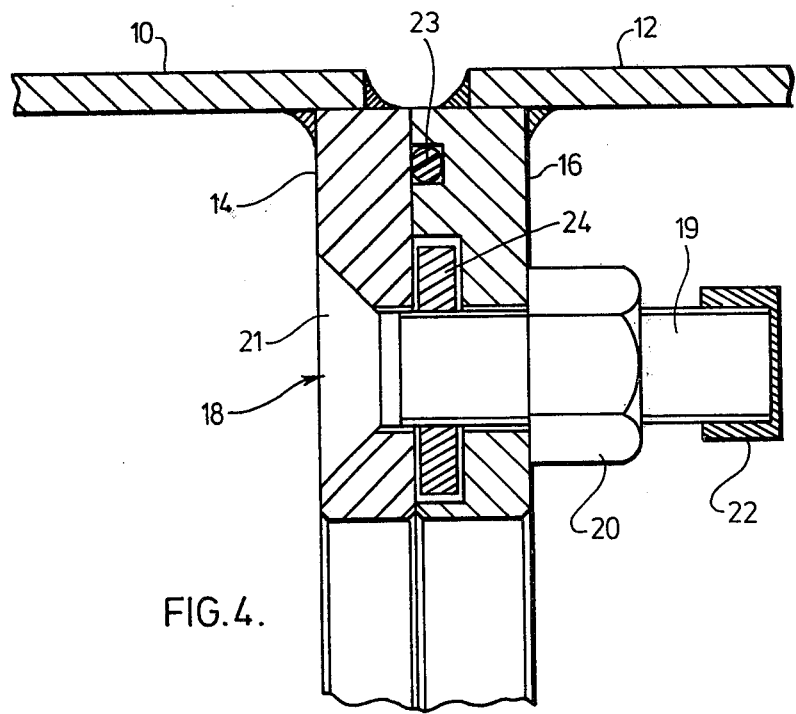
FIG. 3.
FIG. 4.

SPLIT WHEEL SAFETY FEATURE

FIELD OF THE INVENTION

This invention relates to wheel rims upon which pneumatic tires are to be mounted, particularly to split wheel rims for use with large, off-the-road vehicles.

BACKGROUND OF THE INVENTION

Wheels which are made for reception of very large width pneumatic tires, for use on off-the-road vehicles, are commonly made in two complementary rim parts and known as split wheels. Each rim part has an outwardly extending flange formation at one end, to retain the tire, an axially extending cylindrical portion which receives the tire, and a radially inwardly extending flange at the other end, with bolt holes extending therethrough. The wheel is assembled with the two inwardly extending flanges against each other, and bolts or similar securing means extend therethrough to secure the wheel portions together. Other bolt holes in these same flanges provide for mounting the assembled wheel on the vehicle.

Problems can arise with wheels of this type in use, when they are to be dismantled or removed from the vehicle. It is very important that the pneumatic tire carried by the wheel be deflated before dismantling of the wheel is attempted. If this is not done, the pressure within the tire will force the two portions to separate violently as the operator starts to dismantle the wheel, with risk of injury to the operator.

Accidental dismantling of the wheel can also happen, quite easily. It is easy to mistake the bolts holding the two wheel sections together for those attaching the assembled wheel to the vehicle. Both sets of bolts are provided on the same inner flanges of the wheel portions. They may even be located on the same circle. When the vehicle has been used for a period of time off-the-road, normally visible distinctions between the two sets of nuts and bolts may become obscured. There is thus a risk that an operator will cause injury to himself, upon attempting to release the nuts and bolts necessary to change a wheel on the vehicle, with the tire thereon inflated, but mistakenly starting to unfasten bolts holding the two wheel sections together.

An object of the present invention is to provide a split wheel assembly in which this risk is minimized or eliminated.

BRIEF DESCRIPTION OF THE PRIOR ART

One proposal for attempting to overcome such a problem is described in U.S. Pat. No. 2,252,194 Mills, issued Aug. 12, 1941. This patent shows a split wheel rim arrangement in which the two rim sections are bolted to a disc forming a wheel body, by means of securing bolts in radially inwardly extending flanges in the rim section. A bolt or stud passes through aligned apertures in the rim sections, the wheel body, and a ring member extending around the outer face of the flange of one rim section. The apertures in the ring member are of keyhole form, with large and small portions. Before the wheel sections can be dismantled, the nuts on the studs must be loosened sufficiently so that the ring member can be turned circumferentially to bring the studs into the larger ends of the keyhole slots. If there is pressure in the tire, the pressure urges the ring member against the rim flange and it cannot be turned. Such an arrangement does not, however, fully solve the problem of accidental dismantling of split wheel rims, when the wrong bolts are released, under modern conditions. In practice, the ring member is liable to bind against the rims, or against the holding studs, whether the tire is inflated or deflated, due to the accumulation of dirt, grease, etc. during use, and the wheel cannot be easily dismantled at all. Since the arrangement relies on physical tightening of flat surfaces against each other and loosening thereof, its efficient operation is subject to wear and shape deformation of the various parts. It also involves the use of an extra, precision made, heavy part, namely the ring member, serving no other useful function than participation in the safety device, and hence adding to the cost and complexity of the vehicle wheel structure.

BRIEF SUMMARY OF THE INVENTION

It is an object of the present invention to provide a new and improved arrangement for securing together rim sections of a split wheel.

It is a further object of the invention to provide such an arrangement which gives safety to the operator in the event of his accidentally starting to dismantle the wheel whilst there is pressure in the tire, and at the same time is simple and straightforward in design, and hence easy to manufacture.

In the present invention, an arrangement is provided for holding the two rim sections of a split wheel together, whereby the two rims must be separated from one another to a small but positive extent, and then circumferential movement of some of the parts must take place, before the dismantling can be completed. Such an arrangement, involving the positive initial separation of the rim sections, provides an immediate signal to the operator in the event that there is pneumatic pressure in the tire carried by the assembled wheel. When a tubeless tire is mounted thereon, immediate deflation of the tire is caused by the initial separating movement, so that the dismantling may then proceed. In the event that the tire used contains an inner tube, puncturing and deflation of the tube is highly likely, but in any event, the presence of the tube containing air pressure becomes immediately obvious to the operator, warning him to stop dismantling until the pressure in the tire has been released.

Thus according to the present invention, there is provided a wheel for a pneumatic tire, said wheel comprising a first rim portion and a second rim portion, each rim portion having a respective radially extending flange at one axial end thereof, the flanges being adapted to be releasably secured together in the assembled wheel;

the first and second flanges having respective series of circumferentially spaced assembling apertures therein adapted to register with one another;

the assembling apertures of the second flange each comprising a circumferentially extending slot having a narrow end portion and a broad end portion communicating therewith, at least one side wall bounding said aperture having an axially projecting formation thereon, at a position intermediate the narrow end portion and the broad end portion thereof;

securing means adapted to extend through a registered pair of assembling apertures on the first and second flanges, said securing means including a shank portion adapted to pass through the narrow end portion of the aperture in the second flange and the aperture in the first flange, a head portion at one end of the shank portion adapted to be retained by the first flange, a nut threadably received on the shank portion and dimensioned so as to be engageable against side walls defining the narrow end portion of the aperture in the second flange but to pass through the broad end portion thereof, and an enlarged member on the shank portion between the nut and the head portion thereof, engageable against side walls defining the narrow end portion of the aperture in the second flange and adapted to be retained by said axially extending projection thereon against circumferential displacement relative to the flange when the nut is tightened.

In the arrangement of the invention, therefore, the rims are assembled with the securing means passing through the narrow end portion of the slotted aperture in the second flange, and the enlarged member on the shank portion abutting in the circumferential direction against the axially projecting formation on the side walls bounding the aperture in the second flange. Before the rim can be dismantled, the securing means must be moved circumferentially so that the shank portion thereof extends through the broader end portion of the second aperture, through which the threaded nut can pass axially. Before this can happen, the threaded nut has to be loosened sufficiently so that the enlarged member, which is suitably a washer or an integral flange on the shank, can be moved axially over the projecting formation to allow subsequent circumferential movement. The amount of loosening of the nut is therefore a positive, fixed amount defined by the height of the axial projection and the thickness of the enlarged member. Such loosening of the nut causes partial separation of the two rim sections, which, in the case of a tubeless tire mounted thereon, will itself cause unsealing of the tire and deflation thereof, in a harmless manner and with an audible signal to the operator on the release of the air. On the other hand, if the pneumatic tire mounted thereon contains a tube, a portion of the tube will protrude down between the partially separated rim sections, to become visible to the operator in the area of the nut which he is loosening, or more probably to puncture due to forcible engagement with the corners of the rim. In either event, the operator receives clear warning that there is pressure in the tire, and can immediately stop the dismantling to deflate the tire, if deflation does not occur automatically for him.

BRIEF REFERENCE TO THE DRAWINGS

In the accompanying drawings

FIG. 3 is an exploded perspective view of a detail of the first and second flange portions and assembling arrangements therefor according to the invention;

FIG. 4 is a partial sectional view through a wheel assembly according to the present invention.

In the drawings, like reference numerals indicate like parts.

DETAILED DESCRIPTION OF THE SPECIFIC PREFERRED EMBODIMENTS

Figure 1:
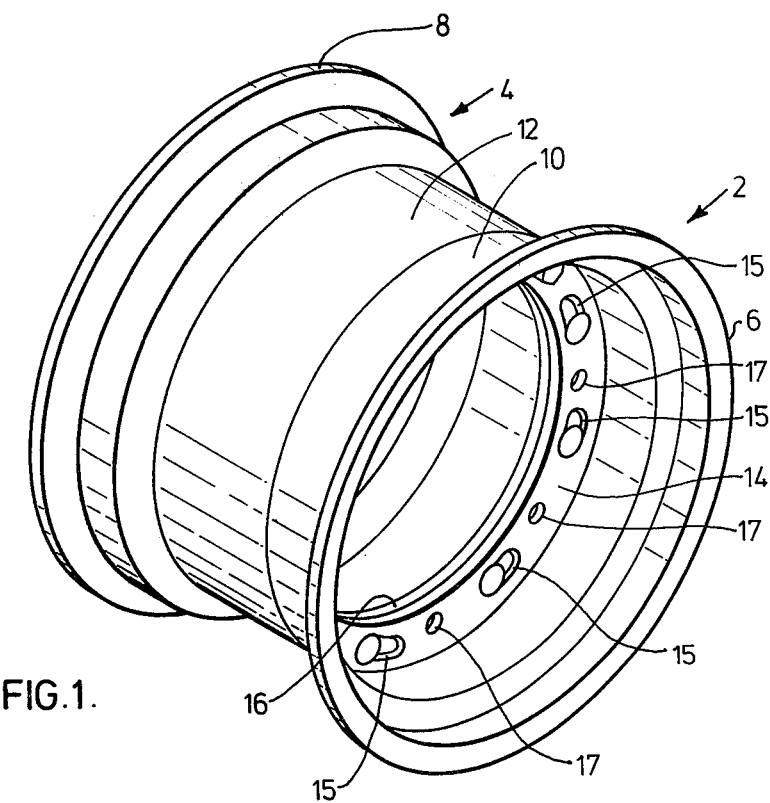
FIG. 1 is a perspective view of an assembled split wheel according to the invention, from the side of the first rim section.
Figure 2:
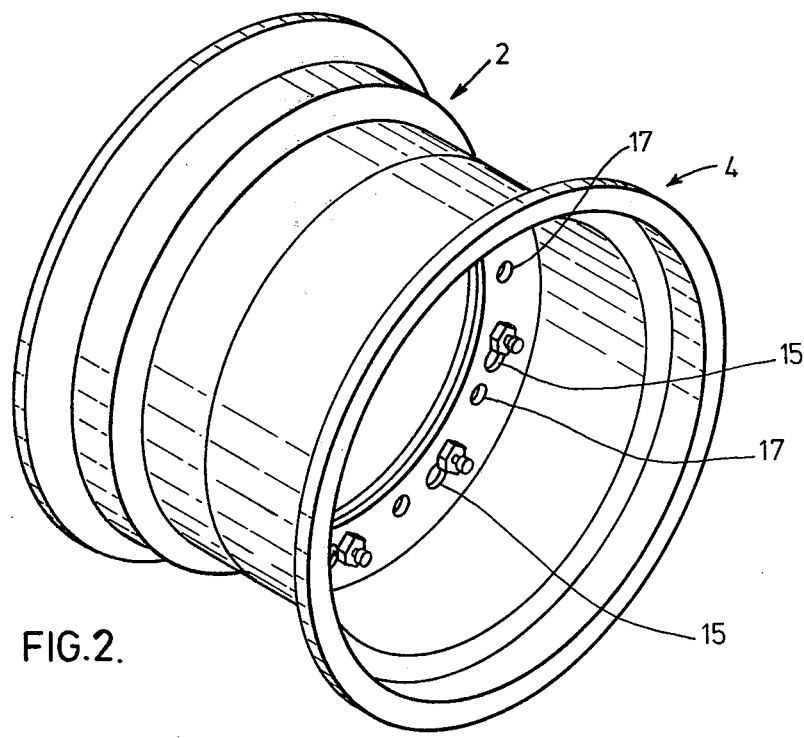
FIG. 2 is a view similar to FIG. 1, but taken from the side of the second rim section.

With reference to FIGS. 1 and 2, a wheel according to the invention comprises a first rim section 2 and a second rim section 4 having respective outwardly extending radial flanges 6, 8 at their axially outer ends, for retaining a tire thereon, and inner cylindrical portions 10, 12, respectively, upon which a pneumatic tire may be mounted. At their inner axial ends, they are provided with respective inwardly extending radial mounting flanges 14, 16, each having two series of circumferentially spaced apertures extending therethrough, and in axial registry with one another. One series of apertures 17 comprise mounting apertures, which are adapted to fit over studs presented on the wheel hub of the vehicle, not shown, so as to releasably secure the assembled wheel in place on the vehicle. The other series 15 are for assembly of the two flanges 14, 16 together, i.e., assembly of the two parts of the wheel 2, 4, in accordance with the invention. It will be noted that the two series of apertures 15, 17, are disposed upon a common circle. When the wheel is mounted on the vehicle, and viewed in the direction towards the vehicle, i.e., generally as shown in FIG. 2, all of the apertures of series 17 and series 15 will contain a hexagon securing nut, and will have a similar appearance, particularly after the vehicle has been in use for a considerable period of time, and is dirty. It would consequently be simple to mistake a hexagon nut in an aperture of series 15 for a hexagon nut in an aperture of series 17, and accidentally start to dismantle the wheel when it was intended merely to remove the assembled wheel from the vehicle.

With reference to FIG. 3, in accordance with the present invention, the flanges 14, 16 of the respective wheel rim sections 2, 4 are secured together by means of a bolt 18, which has a screw threaded shank portion 19, with a retaining nut 20 threadably received thereon. At one end, the bolt 18 has an enlarged integral head 21 (FIG. 4). At its other end, the bolt 18 is provided with an enlarged base part 22 comprising a stop collar, preventing removal of nut 20 from bolt 18. The stop collar 22 is sufficiently strong and massive to resist forcible removal attempts for the nut 20. The shank 19 of the bolt 18 also carries an enlarged member in the form an integral washer 24, extending radially outwardly from the shank 19, between the nut 20 and head portion 21. The diameter of the integral washer 24 is greater than that of the nut 20 as shown clearly in FIG. 4.

A sealing O-ring 23 is received in a groove in second flange 16, and extends circumferentially around the wheel. In the assembled wheel, as shown in FIG. 4, the O-ring 23 seals the two halves of the wheel together, for reception of a tubeless tire thereon.

The series of assembling apertures 15 shown in FIGS. 1 and 2 are made up of a series of circumferentially spaced assembling apertures on the first flange 14 and the second flange 16 respectively, which register with one another axially in the assembled wheel. The apertures 26, in the first flange 14 are of the form of elongated slots. The shank portion 19 of the bolt 18 passes through the slotted aperture 26, but the washer 24 engages against the side walls of the slot 26 on the inner side of the first flange 14, and the head 21 of the bolt 18 engages against the side walls of the slot 26 on the outer side of the flange 14. The head 21 and the washer 24 are axially spaced from each other a distance slightly greater than the thickness of the flange 14, so that the bolt 18 can be moved circumferentially with respect to the flange 14, along slot 26.

The corresponding series of assembling apertures in the second flange 16 are of more complex form, resembling a keyhole slot. The slot has a narrow end portion 28 and broad end portion 30 communicating therewith. A circular depression 32 is formed in the surface of the second flange 16 which is to be presented towards the first flange 14, the circular depression 32 generally surrounding the narrow end 28 of the aperture. The diameter of the circular depression 32 is sufficient to receive therein the integral circular washer 24 on the bolt 18. The depth of the depression 32 is generally corresponding to the thickness of the washer 24. The depression 32 has generally perpendicular side walls, constituting axially extending projecting formations with respect to the assembled wheel. These axially presented side walls have portions 34, 35 nearest to the broad end portion 30 of the slot which also constitute side walls bounding the aperture 28, 30 and constituting axially projecting formations at a position intermediate the narrow end portion 28 and the broad end portion 30 of the aperture. In the assembly, when the washer 24 is received in the circular depression 32, with the shank 19 of the bolt 18 passing through the narrow end portion 28 of the aperture in the second flange 16, the nut 20 is tightened against the under surface of the flange 16, and is too large to pass through the narrow end portion 28 of the slot. The portions 34, 35 of the side walls of the aperture and of the depression 32 then constitute axial projections engaging against the edge of the washer 24 and hence preventing circumferential movement of the bolt 18.

In order to dismantle the wheel assembly according to the invention, referring to FIG. 4, the bolt 20 must first be loosened a sufficient extent so that integral washer 24 can be raised out of engagement with side wall portions 34, 35, and the bolt 18 moved circumferentially of the wheel to extend through the broad end portion 30 of the aperture in the second flange 16. For this to happen, a separation of the two wheel flanges 14, 16 a distance at least equal to the thickness of washer 24 must be achieved, since, as shown in FIG. 4, washer 24 lies wholly within depression 32 when assembled. If the rims carry an inflated tubeless tire, such separation will cause deflation of the tire, and an audible warning to the operator as the air escapes, before the full degree of separation of the rims has been achieved to permit circumferential movement of the bolt 18. If the rims carry an inflated inner tube and tire, the separation of the rim sections will cause the tube to be forced inwardly into the gap where it will puncture, or at least become visible to the operator in the broad end 30 of the aligned assembling apertures. Stop collar 22 protects the operator against the risk that nut 20 will be forcibly blown back and off the bolt 18.

Once the necessary degree of separation of the flanges 14, 16 has been achieved, all the way around the circumference of the assembled wheel, the bolts 18 can be moved circumferentially to the broad end portion 30 of the apertures in flange 16 and then flange 16 can be withdrawn with the nuts 20 passing through the broad portions 30 to dismantle the wheel.

It will be noted that, in the preferred embodiment, the cooperating surfaces of the respective flanges 14, 16 are substantially flat, for best assembly thereof and sealing engagement. The washer 24 is provided between the two flanges 14, 16 in a recess so as not to affect the flush fit of the flange surfaces. The washer 24 can be fixed to the bolt 18, at a desired location, or can if preferred be loose upon the bolt 18. The bolt 18 is loosened from both flanges, so that it may be moved circumferentially with respect to the two flanges, whilst it is removable from the second flange 16, by passage of nut 20 through broad end 30 of the aperture therein, it cannot be wholly removed from first flange 16, since washer 18 will not pass through aperture 26.

Whilst the enlarged member of the bolt, e.g., washer 24, is preferably located beween the two flanges of the wheel portions, this is not essential. It can if desired be provided on the outer surface of one or other of the flanges, with the axial projections similarly located, to prevent its circumferential movement until the nut is loosened a positive extent. However, it is conceivable with such arrangements that the nut 20 could be loosened sufficiently to allow movement of the bolt circumferentially whilst the two flanges remained in tight engagement with each other, due to accumulative dirt, oil or the like, thereby preventing deflation of the tire. Whilst this is unlikely, it is preferred to provide the washer between the flanges of the wheel sections, as illustrated, so that the wheel sections absolutely must be separated to deflate a tire before the wheel can be dismantled.

It will be appreciated that the embodiment described in detail and illustrated in the accompanying drawings is exemplary only, and is not to be construed as limiting the scope of the present invention. Other specific arrangements and configurations are within the scope and spirit of this invention, the scope being defined only by the appended claims.

What I claim is:

1. A wheel for a pneumatic tire, said wheel comprising a first rim portion and a second rim portion, each rim portion having a respective radially inwardly extending flange at one axial end thereof, the flanges being adapted to be releasably secured together in the assembled wheel;

the first and second flanges having respective series of circumferentially spaced assembling apertures therein adapted to register with one another;

the assembling apertures on the second flange each comprising a circumferentially extending slot having a narrow end portion and a broad end portion communicating therewith, the narrow end portion thereof being at least partially bounded by a depression on the surface of the second flange which is presented towards the first flange in the assembled wheel, the side walls of said depression constituting an axially extending formation of the second flange at a position intermediate the narrow end portion and the broad end portion of the assembling aperture therein;

securing means adapted to extend through a registered pair of assembling apertures on the first and second flanges, said securing means including a shank portion adapted to pass through the narrow end portion of the aperture in the second flange and the aperture in the first flange, a head portion at one end of the shank portion adapted to be retained by the first flange, a nut threadably received on the shank portion and dimensioned so as to be engagable against side walls defining the narrow end portion of the aperture in the second flange but to pass through the broad end portion thereof, and an enlarged member on the shank portion between the nut and the head portion thereof, engagable against side walls defining the narrow end portion of the aperture in the second flange and adapted to be retained by said axially extending formation thereon against circumferential displacement relative to the flange when the nut is tightened.

2. A wheel according to claim 1 wherein the securing means includes an integral enlarged base part at the end of the threaded shank remote from the head portion thereof, said base part being dimensioned so as to pass through the broad end portion of the assembling aperture in the second flange, but preventing the removal of the threaded nut from the shank.

3. A wheel according to claim 1 wherein said depression is generally circular, and said enlarged member of the securing means is circular, of a diameter to be a close fit within the circular depression.

4. A wheel according to claim 1 wherein the thickness of the enlarged member substantially corresponds to the depth of the depression.

5. A wheel according to claim 4 wherein the narrow end portion of the assembling aperture on the second flange has substantially parallel side walls and a semi-circular end wall, and the broad end portion has a part circular side wall.

6. A wheel according to claim 3 wherein said enlarged member of the securing means comprises an annular washer, freely slidable on the threaded shank portion thereof.

7. A wheel according to claim 3 wherein said enlarged member of the securing means comprises a circular flange fixed to the shank portion, the axial distance between the circular flange and the head portion thereof substantially corresponding to the thickness of the first flange.

* * * * *